United States Patent
Emara et al.

(10) Patent No.: US 11,581,657 B1
(45) Date of Patent: Feb. 14, 2023

(54) MULTI-DIRECTIONAL, MULTI-PORT ARRAY ANTENNA STRUCTURE

(71) Applicant: Everest Networks, Inc., Santa Clara, CA (US)

(72) Inventors: Mohamed K. Emara, Santa Clara, CA (US); Daniel J. King, Santa Clara, CA (US); Hoang Nguyen, Santa Clara, CA (US); Samer Abielmona, Montreal (CA); Shulabh Gupta, Santa Clara, CA (US)

(73) Assignee: Everest Networks, Inc., Mountain View, CA (US)

( * ) Notice: Subject to any disclaimer, the term of this patent is extended or adjusted under 35 U.S.C. 154(b) by 293 days.

(21) Appl. No.: 16/601,566

(22) Filed: Oct. 14, 2019

Related U.S. Application Data

(60) Provisional application No. 62/745,241, filed on Oct. 12, 2018.

(51) Int. Cl.
*H01Q 13/00* (2006.01)
*H01Q 21/06* (2006.01)
*H01Q 3/26* (2006.01)
*H01Q 3/24* (2006.01)
*H01Q 1/00* (2006.01)
*H01Q 1/22* (2006.01)
*H04B 7/0452* (2017.01)
*H01Q 13/10* (2006.01)

(52) U.S. Cl.
CPC .......... *H01Q 21/064* (2013.01); *H01Q 1/002* (2013.01); *H01Q 1/2283* (2013.01); *H01Q 3/245* (2013.01); *H01Q 3/2605* (2013.01); *H01Q 13/10* (2013.01); *H04B 7/0452* (2013.01)

(58) Field of Classification Search
CPC .... H01Q 21/064; H01Q 1/002; H01Q 1/2283; H01Q 3/245; H01Q 3/2605; H01Q 13/10; H04B 7/0452
See application file for complete search history.

(56) References Cited

U.S. PATENT DOCUMENTS 11,069,975 B1 * 7/2021 Mason ............... H01Q 1/246
2015/0110212 A1 * 4/2015 Pabla ................ H01Q 21/068
375/267

FOREIGN PATENT DOCUMENTS

CN 101232126 A * 7/2008
WO WO-0106595 A2 * 1/2001 ............. H01Q 1/246

* cited by examiner

*Primary Examiner* — Dieu Hien T Duong
(74) *Attorney, Agent, or Firm* — Fish & Richardson P.C.

(57) ABSTRACT

A simple multi-directional, multi-port array antenna structure is disclosed that can be used for a variety of applications, including but not limited to direction finding (DF) and beam-forming applications in receive and transmit modes, respectively. The disclosed antenna structure offers unique functionalities in both receive and transmit modes. For DF applications in the receive mode, the back-end of the antenna structure features a power sensing mechanism to monitor the power received at all ports. In the transmit mode, the disclosed antenna structure is used for beamforming applications by providing individual port excitation and using antenna arrays.

10 Claims, 7 Drawing Sheets

MULTI-DIRECTIONAL, MULTI-PORT ARRAY ANTENNA STRUCTURE

CROSS-RELATED APPLICATIONS

This application claims the benefit of priority of U.S. Provisional Application No. 62/745,241, filed Oct. 12, 2018, for "Multi-port Slot Array Antenna for Millimeter-wave Direction Finding and Beam-forming Applications," which provisional application is incorporated by reference herein in its entirety.

TECHNICAL FIELD

This application discloses a multi-directional, multi-port array antenna system and methods for use in a wireless device.

BACKGROUND

For several wireless applications, the critical component of the wireless device is a directional receive antenna or antenna array designed for monitoring a sector of space at specific frequencies. Some examples of applications that can benefit from directional antennas include, without limitations, direction finding (DF), which is the process of determining the angle of arrival (AoA) of a received signal and therefore the location of the transmitter. DF is important for many applications, including navigation, frequency spectrum monitoring, military electronic support, and various radar applications. DF systems are also relevant in the future implementation of fifth generation (5G) networks and Internet of Things (IoT), especially for indoor localization applications. Another example of a wireless application which can benefit from directional antennas is transmit or receive beamforming of radio frequency (RF) signals and their usage in multiple input multiple output (MIMO) or multi-user MIMO (MU-MIMO) communications.

Directional antennas were reported for the high frequency (HF), very high frequency (VHF), and ultra-high frequency (UHF) bands, Ku-band, and the W-band. State-of-the-art directional antennas, however, are either too complex or lack a sufficient field of view required for some applications.

SUMMARY

A multi-directional, multi-port array antenna structure is disclosed for use with various wireless applications, including but not limited to direction finding (DF) and beam-forming applications in receive and transmit modes, respectively. The multi-directional, multi-port antenna array structure provides unique functionalities in both receive and transmit modes. The antenna structure includes multiple antenna arrays that radiate RF signals in different directions. For DF applications in the receive mode, a back-end of the system features a power sensing mechanism to monitor the power received at all ports of the antenna structure. In the transmit mode, the antenna structure is used for beamforming applications using individual port excitation and antenna sub-arrays. The antenna structure characteristics are demonstrated using full-wave simulations at 58-61 GHz based on circularly polarized slot arrays using substrate integrated waveguide (SIW) technology. The high angle of arrival (AoA) resolution and a wide sector coverage, makes the antenna structure good candidate for 5G wireless systems.

Details of one or more implementations of the disclosed technologies are set forth in the accompanying drawings and the description below. Other features, aspects, descriptions and potential advantages will become apparent from the description, the drawings and the claims.

Certain illustrative aspects of the disclosed technologies are described herein in connection with the following description and the accompanying figures. These aspects are, however, indicative of but a few of the various ways in which the principles of the disclosed technologies may be employed and the disclosed technologies are intended to include all such aspects and their equivalents. Other advantages and novel features of the disclosed technologies may become apparent from the following detailed description when considered in conjunction with the drawings.

DETAILED DESCRIPTION

Figure 1:
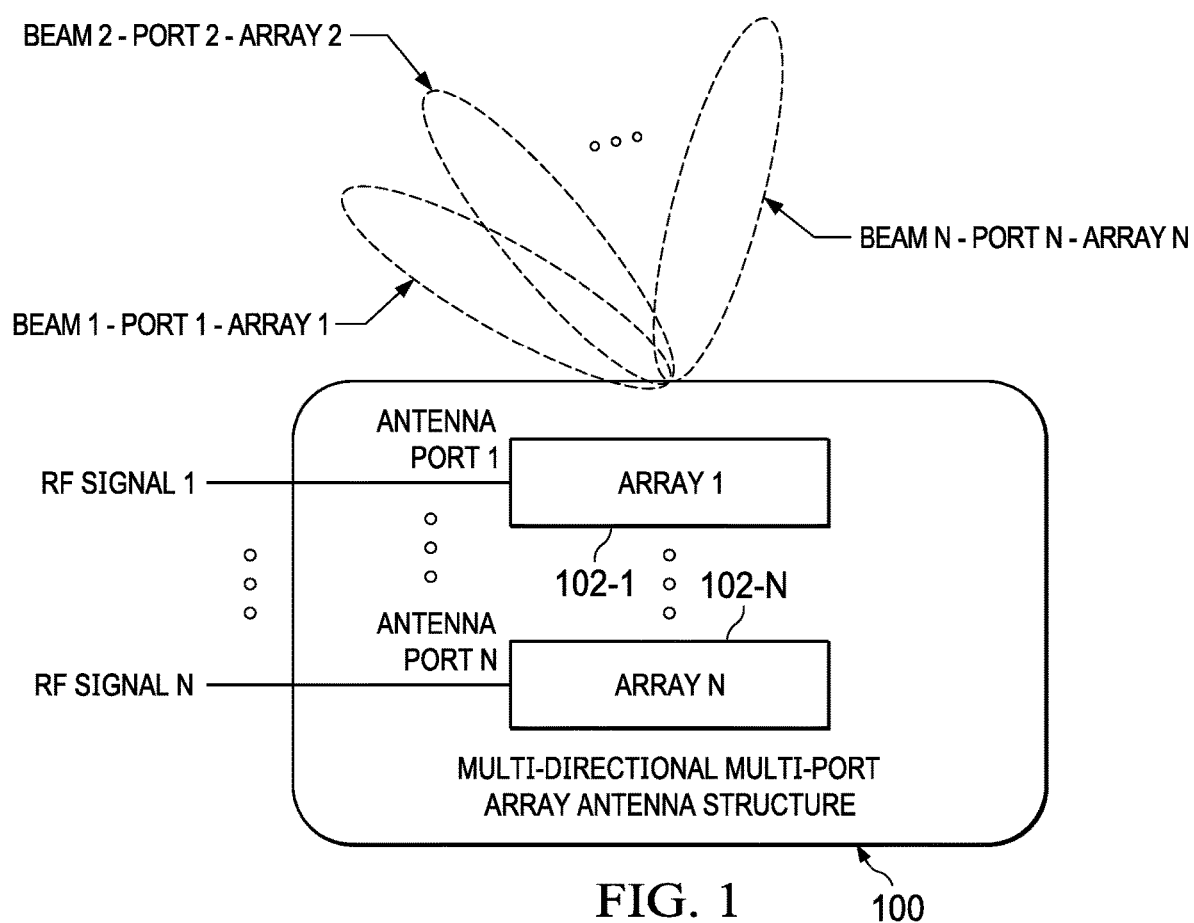
FIG. 1 illustrates a multi-directional, multi-port array antenna structure that includes multiple antenna arrays, according to an embodiment.
Figure 2:
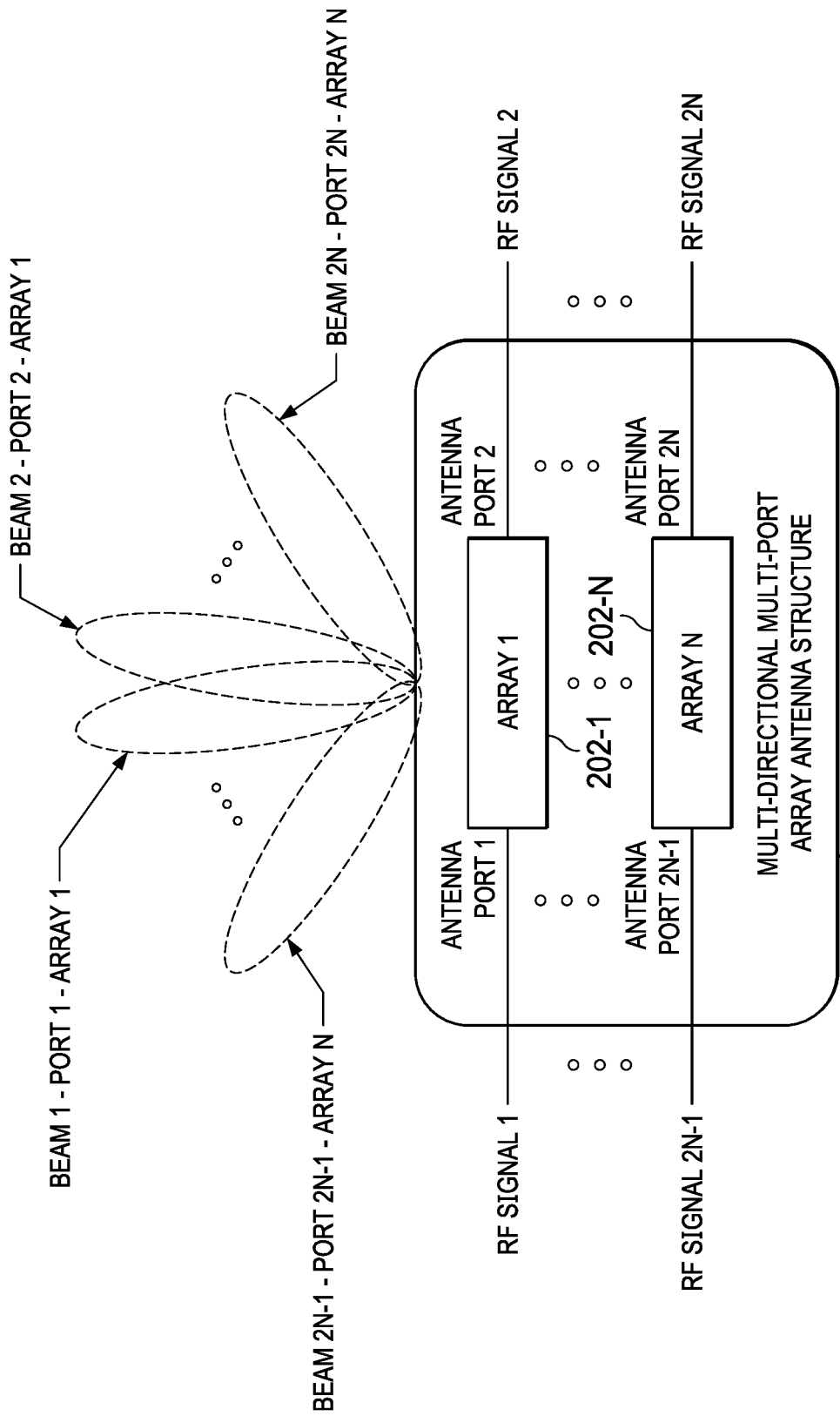
FIG. 2 illustrates an alternative multi-directional, multi-port array antenna structure, where each array has two ports and different RF signals exciting each port are radiated in different directions, according to an embodiment.

FIG. 1 illustrates a multi-directional, multi-port array antenna structure 100 that includes multiple arrays 102-1 . . . 102-N, where the beams for each array are centered at different angles to achieve a wide coverage sector, according to an embodiment. The ports of the different arrays 102-1 . . . 102-N are excited by separate RF signals that are radiated according to the beam of each array. The RF signals can occupy the same or different RF channels, where a RF channel is defined by the RF spectrum bandwidth centered at a carrier frequency. In some instances all arrays 102-1 . . . 102-N are simultaneously excited by RF signals, while in other instances one or more arrays are simultaneously excited. FIG. 2 illustrates an alternative antenna structure 200 where each array 202-1 . . . 202-N has two ports and different RF signals exciting each port are radiated in different directions, according to an embodiment.

Figure 3A:
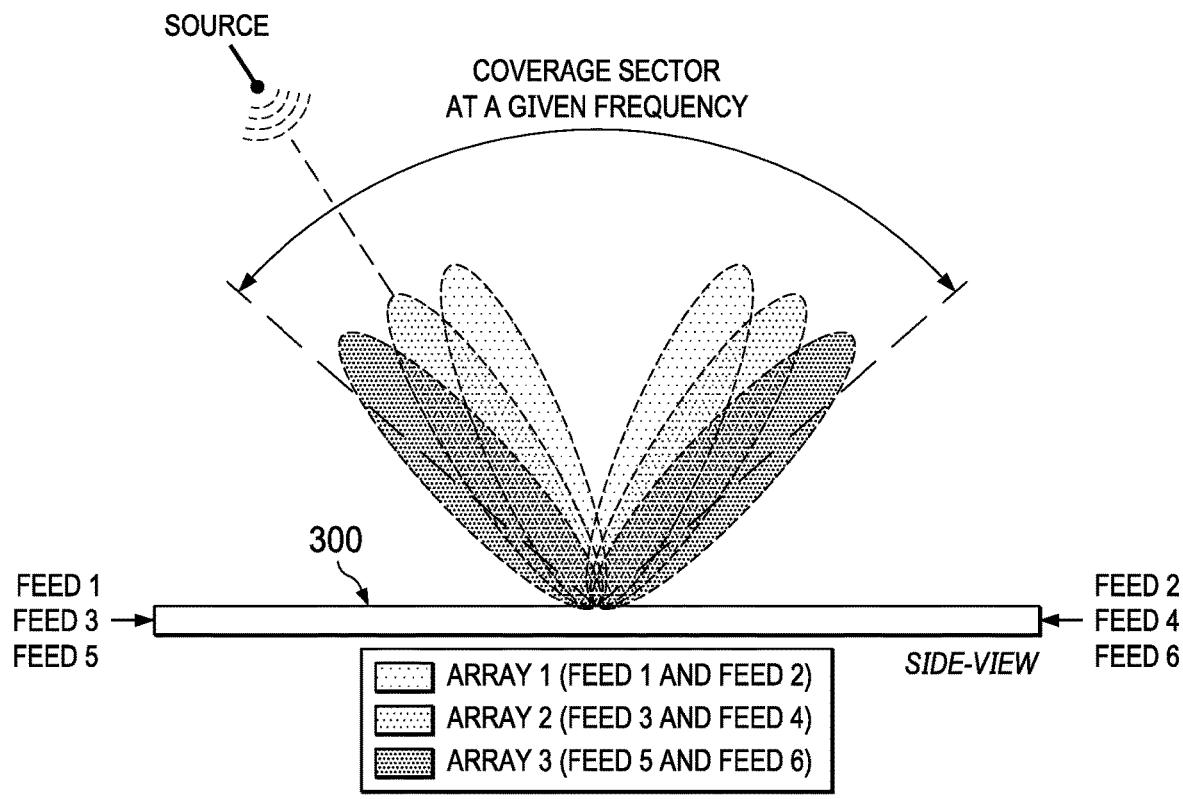
FIG. 3A is a side view of a multi-directional, multi-port array antenna structure, according to an embodiment.
Figure 3B:
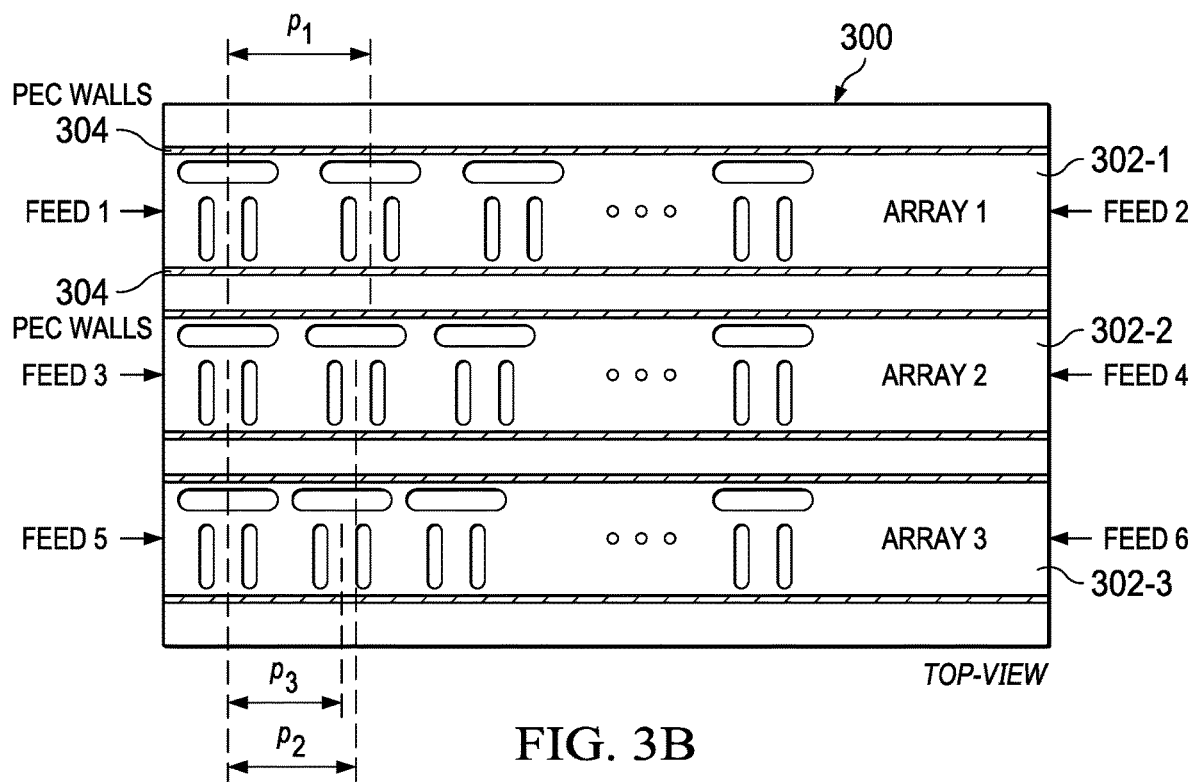
FIG. 3B is a top view of the antenna structure of FIG. 3A, according to an embodiment.

An illustration of an embodiment of a multi-directional, multi-port array antenna structure 300 is shown in FIGS. 3A and 3B. A circularly polarized (CP) beam-scanning substrate integrated waveguide (SIW) slot array antenna 300 is used for the antenna structure. This structure can be implemented in the millimeter-wave (mm-wave) band. The antenna structure 300 provides two-dimensional (2D) scanning from about 58-61 GHz and a sector coverage of about 80° (+40° to −40°, measured from broadside) at 58 GHz. The antenna structure 300 uses multiple arrays separated by perfect electrical conductor (PEC) walls 304, where the beams are centered at different angles to achieve a wide coverage sector. The antenna structure 300 is a promising candidate for future implementation of DF and wireless systems for mm-wave applications. In the embodiment shown, the antenna structure 300 includes N arrays (3 arrays 302-1 . . . 302-N are shown in FIGS. 3A, 3B), and 2N ports (6 ports shown in FIGS. 3A, 3B). In an embodiment, each array 302 is a 2-port frequency beam-scanning periodic leaky-wave CP slot antenna. At a given frequency, the antenna has a forward or a backward beam (i.e. at +θ & −θ from broadside) depending on the feeding port (i.e. left or right). The N arrays have different slot periods, p, such that for a given frequency each array points in a different direction to achieve a wide beam coverage. The beam direction for each array is a function of frequency and the slot period, and is given by the beam-scanning law of periodic leaky-wave antennas:

$$\sin\theta \approx \left(\frac{\beta_{-1}}{k_0}\right) \quad (1)$$

where θ is the beam direction measured from broadside, $k_0$ is the fundamental wavenumber, $\beta_{-1}$ is the n=−1 space harmonic and is calculated as follows:

$$\beta_{-1} = \left(\beta_0 - \frac{2\pi}{p}\right) \quad (2)$$

where $\beta_0$ is the phase constant of the fundamental mode and p is the period of the slot array, as shown in FIG. 3B.

Other embodiments of the structure are possible such as, without limitations, an antenna structure where each array is a linear array of patch antennas and where the feeding network of each array is designed to radiate a RF signal in a different direction.

SIW technology was chosen for the implementation of the antenna embodiment shown in FIGS. 3A, 3B. SIW slot array antennas are desirable for mm-wave applications due to their low-profile, high efficiency (i.e. low loss), high gain, and high bandwidth. In addition, SIW slot arrays can be fabricated using conventional printed circuit board (PCB) techniques, which makes them mass producible, and easy to integrate with active devices. For minimum feed loss, a slot array can be fed with a waveguide. A co-planar waveguide (CPW) connector can also be used to feed the antenna, however this feeding requires a CPW-SIW transition.

For several applications, CP antennas are more desirable compared to linearly polarized (LP) antennas. In the receive mode, a CP antenna can detect a signal in any orientation, which is especially important since the polarization of an incoming wave is a priori not known. This improves the DF of transmitters aligned in any arbitrary orientation. In the transmit mode, a linear receiver can detect the CP signals from the antenna structure 300 regardless of the orientation of the antenna or the receiver, in addition to creating richer signal diversity by using polarization.

In an embodiment, the antenna structure 300 is designed using a CP unit cell consisting of one longitudinal and two transverse slots, as shown in FIG. 3B. This unit cell is based on a CP slot antenna design where two slots, one longitudinal and one transverse, were used as a matching element.

FEM-HFSS was used to simulate 3 arrays on a substrate with $\varepsilon_r$=3.66, tan δ=0.004. Antenna slot sizes and spacings were optimized for the best axial ratio in the beam direction (<3 dB) and the best return loss (<−15 dB from 58-61 GHz). The number of unit cells in each array was chosen such that the transmission is <−10 dB from 58-61 GHz to ensure maximum radiation, and hence minimum residual power at the non-feeding port. Waveports were used to feed the arrays on either side. In an embodiment, WR-15 waveguide feeds are used to feed the arrays on either side, or CPW feeds with CPW-SIW transitions to the array.

Figure 4A:
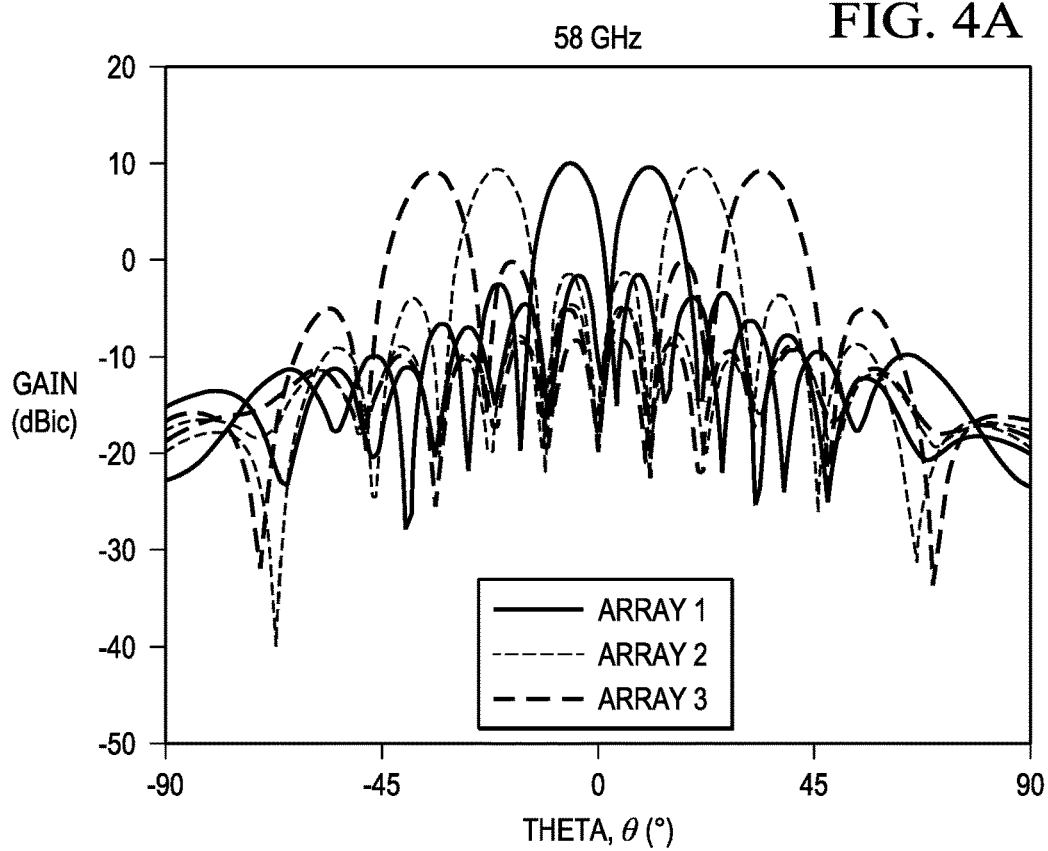
FIG. 4A shows the radiation patterns of the arrays at 58 GHz, according to an embodiment.
Figure 4B:
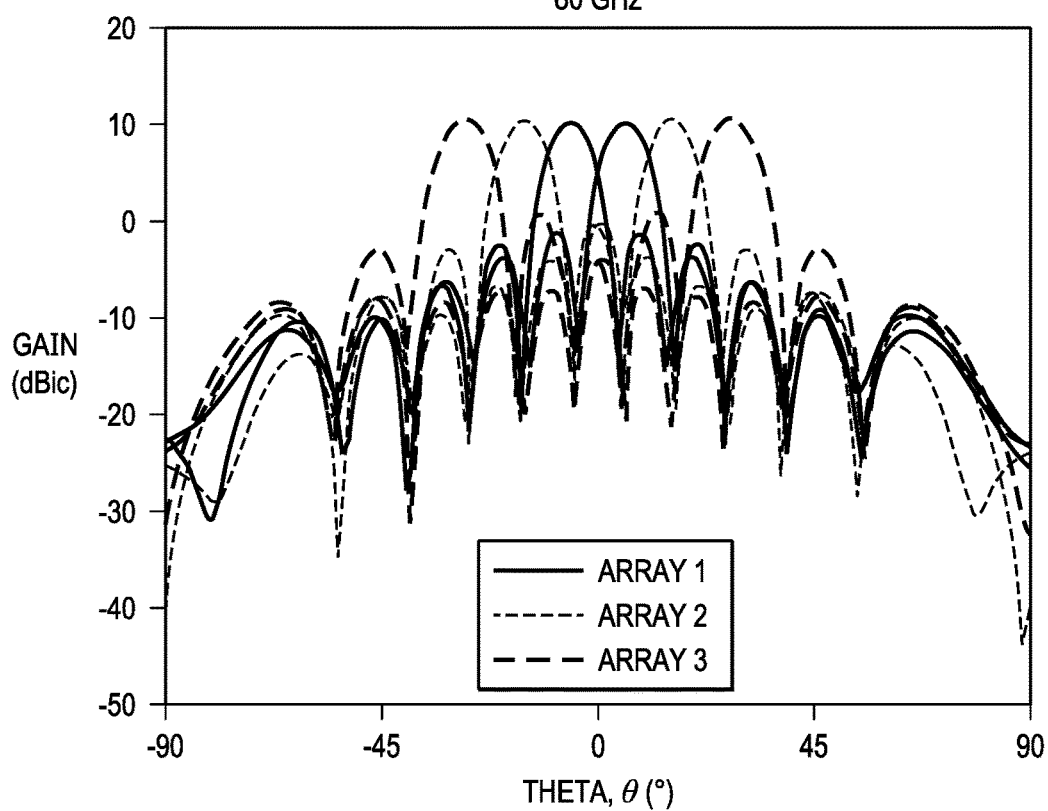
FIG. 4B shows the radiation patterns of the arrays at 60 GHz, according to an embodiment.
Figure 4C:
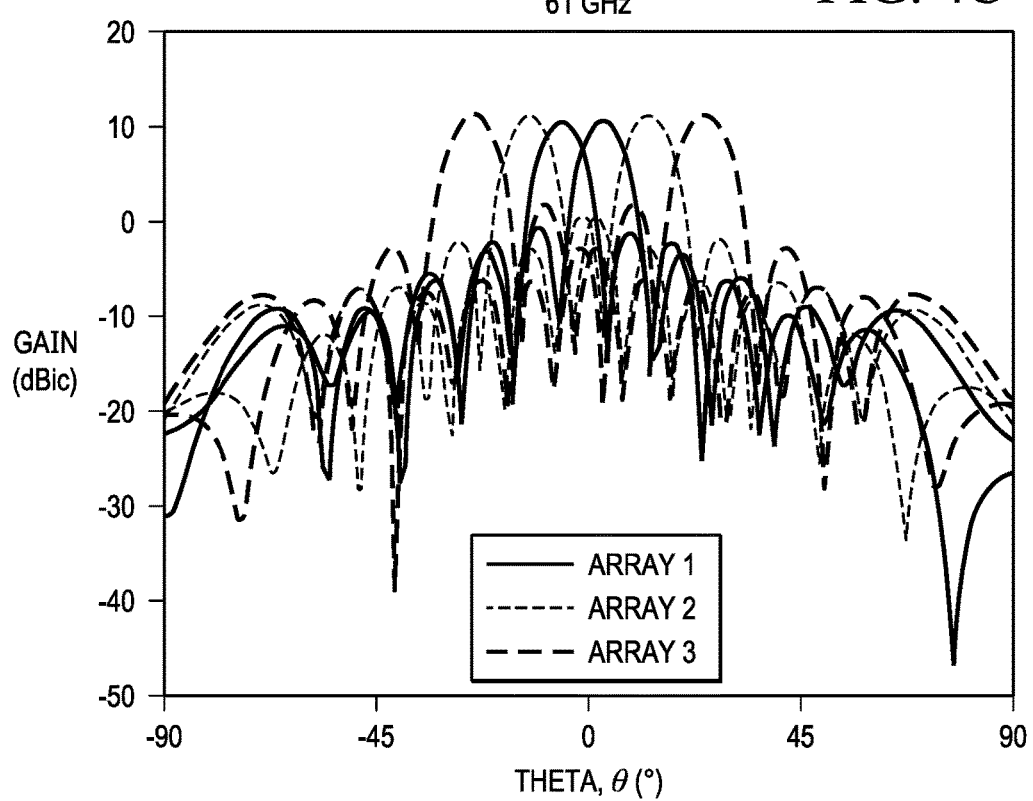
FIG. 4C shows the radiation patterns of the arrays at 61 GHz, according to an embodiment.

FIGS. 4A-4C show the radiation patterns of the 3 arrays at 58, 60, and 61 GHz, respectively. The antenna structure was designed such that all the array beams intersect at −3 dB (down from the maximum gain) at 60 GHz, as shown in FIG. 4B. This means that the AoA resolution at 60 GHz is equal to the beamwidth. The resolution improves at higher frequencies, where the beams are closer together, as shown in FIG. 4C. On the other hand, the resolution degrades at lower frequencies, where the beams are further apart, as shown in FIG. 4A. Multi-port measurements for several frequencies can be used to improve the resolution with more involved algorithms.

Example Applications

Direction Finding in Receive Mode

Figure 5:
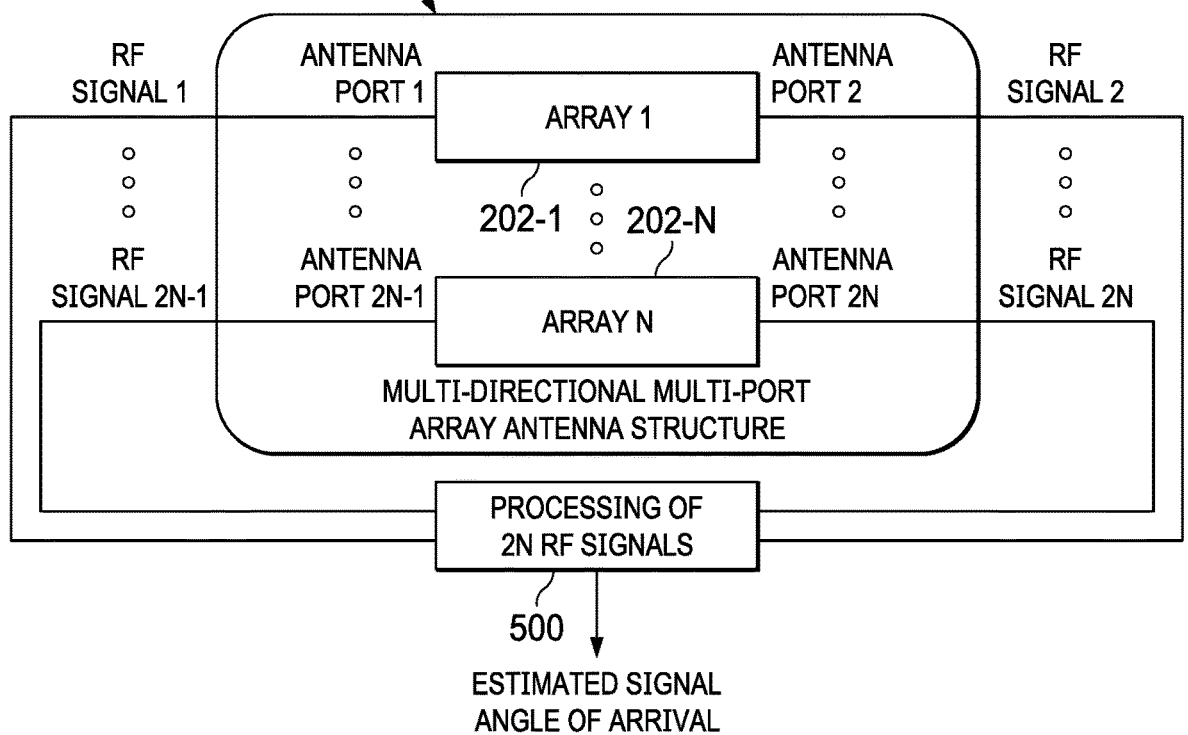
FIG. 5 illustrates how RF signals received at 2N RF ports are monitored and processed, according to an embodiment.

A first wireless application relates to DF in receive mode. In the receive mode, the antennas are used for direction finding applications. At any given frequency, the antennas can "sense" 2N angles of arrival. The feeding direction of each array (i.e. left or right) determines the beam direction (forward or backward). Conversely, a signal at a given frequency, wo, arriving from an unknown direction of space (angle $\theta_r$) will be received the strongest at a specific port only, corresponding to the array and port (left or right), where $(\theta_r, \omega_0)$ satisfies its respective beam-scanning law. As shown in FIG. 5, during the antenna operation in receive mode, the RF signals received at all 2N ports are monitored and processed by processing unit 500. The RF signals can be monitored simultaneously in parallel or serially at different time instants. The port at which the signal was received with the strongest power will provide the information needed to determine the direction of arrival of the received signal based on the beam-scanning law of individual antennas.

In an embodiment, the AoA resolution of the antenna structure 200 is equal to the 3-dB beam-width at the center frequency (the frequencies where the beams intersect at −3 dB from maximum gain). The resolution can be improved by reducing the beam-width (e.g., using longer arrays 202-1 . . . 202-N at the expense of smaller sector coverage for the same number of arrays. The sector coverage can, however, be increased by increasing the number of arrays 202-1 . . . 202-N used. More sophisticated methods or algorithms to process the RF signals by processing unit 500, such as the multiple signal classification (MUSIC) algorithm, can be used to further improve the resolution in post-processing.

Beam-Forming in Transmit Mode

Figure 6:
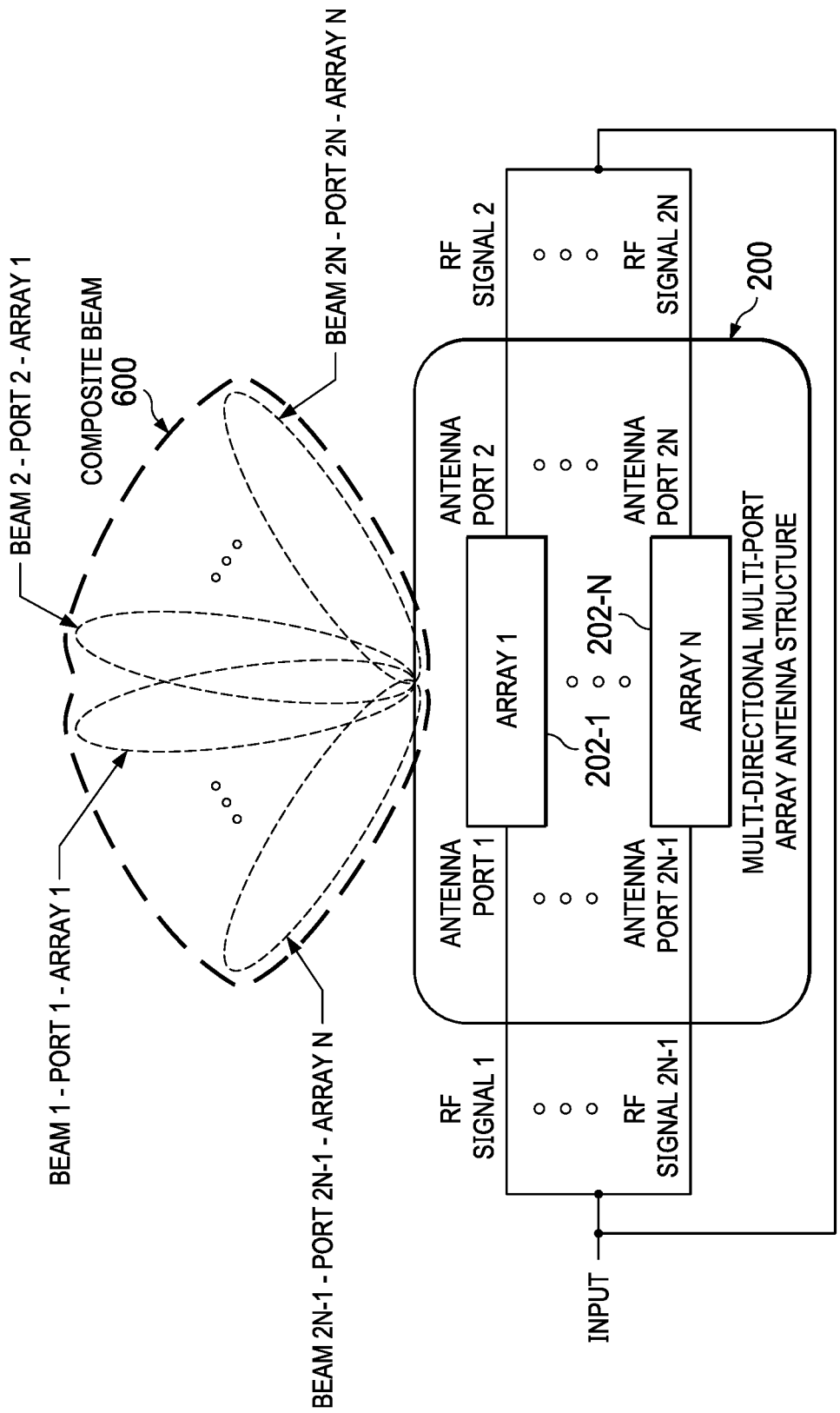
FIG. 6 illustrates how individual radiation patterns of each array (when excited from both sides with a power divider) overlap with each other so as to create a wider composite beam that is ideal for providing a large spatial sector coverage, according to an embodiment.
Figure 7:
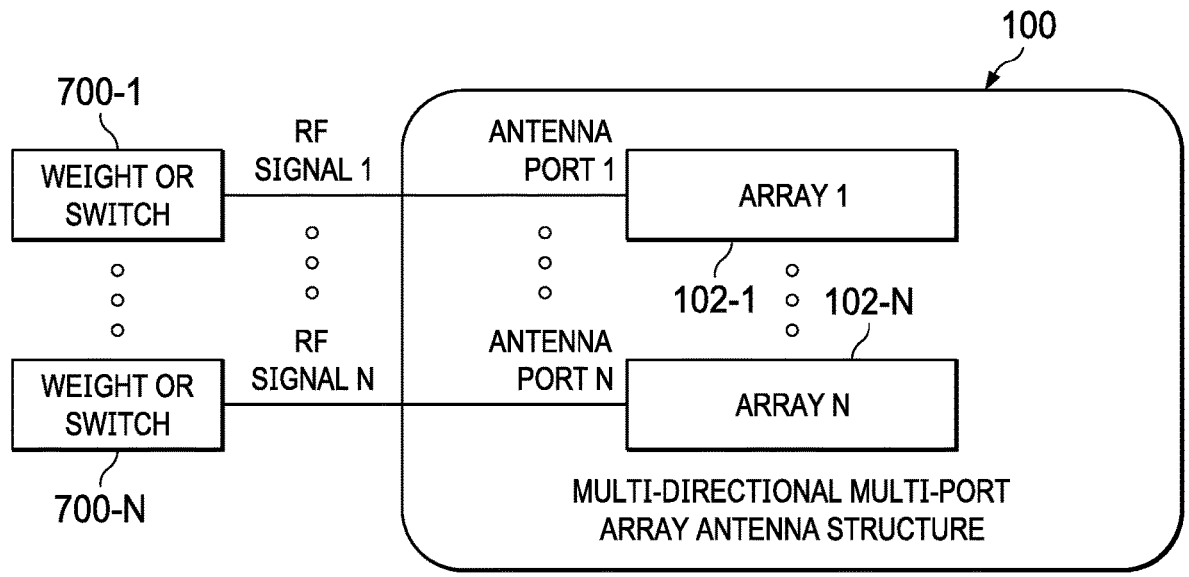
FIG. 7 illustrates excitation weights (amplitude and phase) of N (or 2N)-ports in conjunction with the design of various arrays and their spacings, according to an embodiment.

A second wireless application relates to beamforming in transmit mode (for clarity, but without limitations, we only discuss transmit mode beamforming but similar embodiments can be used for receive mode beamforming). In this application, the same antenna structure 100 shown in FIG. 1 or 200 shown in FIG. 2 can also be used in the transmit mode, where the N or 2N ports can either be excited together or separately. As shown in FIG. 6, when excited together the individual radiation patterns of each array 202-1 . . . 202-N (e.g., when excited from both sides) overlap with each other so as to create a wider composite beam 600 that is ideal for providing a large spatial sector coverage. This is a different approach than the approach used by typical slot antenna arrays at mm-wave frequencies which are electrically large and provide highly directive beams. Therefore, as shown in FIG. 7, the selecting and implementing (in the analog domain) the excitation weights 700-1 . . . 700-N (amplitude and phase) of N (or 2N)-ports in conjunction with the design of various sub-arrays and their spacings, can be used to generate a specified wide-beam radiation pattern of the structure, i.e. beam-forming. In the approach shown in FIG. 6, the arrays 202-1 . . . 202-N are fed by a 1-to-N power divider on both the left and the right side, and a 1-to-2 power divider between the two sides makes an overall 1-port antenna structure. Note that the beamforming structures shown in FIGS. 6 and 7 can also be implemented in the digital domain on baseband signals.

Alternatively, the RF signals feed to the N or 2N ports can be controlled using an electronic switch to determine which antenna and port to "turn on" for signal transmission (the electronic switch is equivalent to setting the weight to zero (off-state) or one (on-state)). This embodiment is ideal for opportunistically re-directing the signals to specific spatial sectors of space in real-time. Transmit or receive beamforming through digital weights or analog weights or RF switches can be used in conjunction with various wireless transmission techniques, particularly ones like MIMO and MU-MIMO, which employ beamforming techniques to increase signal level and minimize interference. Therefore, owing to the flexible multi-port operation, the disclosed antenna structure can transmit signals and support efficient MIMO and MU-MIMO transmissions in a wide sector of space based on smart beamforming, which is promising for various applications including indoor wireless systems.

Figure 8:
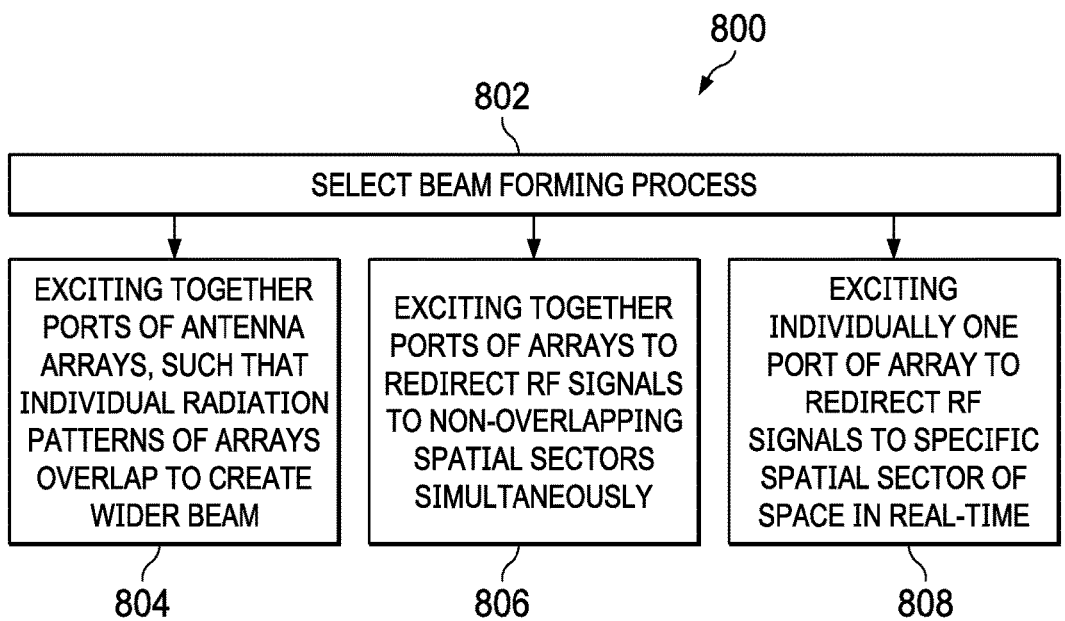
FIG. 8 is a flow diagram of a beam-forming application using a multi-directional, multi-port array antenna structure, according to an embodiment.

FIG. 8 is a flow diagram of a beamforming process 800 using a multi-directional, multi-port array antenna structure, according to an embodiment. Process 800 includes exciting together ports of an antenna array, such that individual radiation patterns of the antenna array overlap with each other according to their respective weight to create a wider beam, thereby providing a large spatial sector coverage (801); or exciting together ports of the antenna array, thereby redirecting radio frequency (RF) signals to multiple non-overlapping spatial sectors simultaneously (802); or exciting individually one of the ports of the antenna array, thereby redirecting RF signals to a specific spatial sector of space in real-time (804).

A simple multi-port antenna structure has been disclosed which can be used for direction finding and beam-forming applications in receive and transmit modes, respectively. The proposed antenna offers unique functionalities in both receive and transmit modes. For DF applications in the receive mode, the back-end of the system will feature a power sensing mechanism to monitor the power received at all ports. In an implementation, the port that receives the highest power and the frequency of the signal provides enough information to determine the direction of arrival of the received signal. However, the information about the power received at all ports and multiple frequencies can be further exploited to increase the system resolution based on more involved signal processing on a software level. The structure can also be used to detect signals from multiple sources simultaneously, since the principle of superposition holds.

In the transmit mode, the disclosed antenna structure can be used for beam-forming applications by providing individual port excitation and using antenna arrays. In one implementation, the arrays and ports operate independently of each other and a switch controls which array and port are used for transmission. In another implementation, the arrays are fed simultaneously from each side using a 1-to-N power divider to create a wide beam at each frequency. The proposed antenna structure characteristics have been demonstrated at 58-61 GHz based on circularly polarized slot arrays using SIW technology. The disclosed antenna structure based on slot arrays thus represents an attractive solution for 5G systems and various IoT applications.

A few embodiments have been described in detail above, and various modifications are possible. While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. Other embodiments fall within the scope of the following claims.

What is claimed is:

1. A method of beamforming using a multi-directional, multi-port array antenna structure, the method comprising:
   determining whether the antenna structure is in a direction finding or beamforming mode of operation;
   in accordance with determining that the antenna structure is in a beamforming mode of operation, selecting one of a plurality of beamforming processes comprising:
      exciting together at least two ports of each antenna array of a plurality of antenna arrays, such that individual radiation patterns of the excited antenna arrays overlap with each other to create a wider beam, thereby providing a large spatial sector coverage; or
      exciting together at least two ports of each antenna array of the plurality of antenna arrays, thereby redirecting radio frequency (RF) signals to multiple non-overlapping spatial sectors simultaneously; or
      exciting individually one of the ports of one antenna array of the plurality of antenna arrays, thereby redirecting RF signals to a specific spatial sector of space in real-time.

2. The method of claim 1 wherein the antenna arrays are linear.

3. The method of claim 1, wherein the RF signals received at the different ports are processed to determine an angle of arrival (AoA) of a received signal.

4. The method of claim 1, further comprising monitoring, using a power sensing module, the power received at all ports.

5. The method of claim 1, wherein the RF signals are weighted to achieve a wide beam, radiation pattern that is wider than the beam radiation pattern of an individual array of the antenna arrays.

6. The method of claim 1, further comprising creating, by a power divider module coupled to a multiplicity of ports, a wide beam at the RF signal frequency.

7. The method of claim 1, where an electronic switch is used to enable the transmission of a RF signal from an antenna array of the plurality of antenna arrays.

8. The method of claim 1, wherein each antenna array of the plurality of antenna arrays is a slot-antenna array with two ports; and
   wherein, at a given frequency, each of the slot-antenna arrays has a forward or a backward beam, at $+\theta$ & $-\theta$ from broadside, depending on the side of feeding port, left or right; and
   wherein the slot-antenna arrays have different slot periods, p, such that for a given frequency, each of the slot-antenna arrays points in a different direction to achieve a wide beam coverage.

9. The method claim 8, wherein the slot-antenna arrays are implemented based on substrate integrated waveguide (SIW) technology.

10. The method of claim 8, wherein the slot-antenna arrays are implemented based on printed circuit board (PCB) technology.

* * * * *